(12) United States Patent
Livowsky (10) Patent No.: US 6,594,657 B1
(45) Date of Patent: *Jul. 15, 2003

(54) SYSTEM AND METHOD FOR ENHANCING ONLINE SUPPORT SERVICES USING NATURAL LANGUAGE INTERFACE FOR SEARCHING DATABASE

(75) Inventor: Jean-Michel Livowsky, Epinay s/Seine (FR)

(73) Assignee: Albert-Inc. SA, Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/327,603

(22) Filed: Jun. 8, 1999

(51) Int. Cl.[7] .............................................. G06F 17/30
(52) U.S. Cl. ............................. 707/5; 707/102; 707/10; 707/104.1; 709/217; 709/203
(58) Field of Search ............................. 707/3, 4, 10, 5, 707/6, 102; 704/4, 7, 9, 257

(56) References Cited

U.S. PATENT DOCUMENTS

| | | | |
|---|---|---|---|
| 4,674,066 A | * 6/1987 | Kucera | 364/900 |
| 4,974,191 A | 11/1990 | Amirghodsi et al. | 364/900 |
| 5,197,005 A | 3/1993 | Shwartz et al. | 364/419 |

(List continued on next page.)

FOREIGN PATENT DOCUMENTS

| | | | |
|---|---|---|---|
| JP | 11 045266 | 2/1999 | G06F/17/30 |
| WO | WO 98/25217 | 6/1998 | G06F/17/30 |
| WO | WO 98/26357 | 6/1998 | G06F/17/30 |
| WO | WO 98/49640 | 11/1998 | G06F/17/60 |
| WO | WO 00/03329 | 1/2000 | G06F/17/00 |

OTHER PUBLICATIONS

Karen Kukich: "Techniques for Automatically Correcting words in Text", Dec. 1992, ACM, vol. 24, No. 4 p. 378–439.*

Zobel et al.: "Phonetic String Matching: Lessons from information Retrieval", Aug. 1996, ACM 0–89791–792, p. 166–172.*

Das, Bikas et al. "Experiments In Using Agent–Based Retrieval from Distributed and Heterogeneous Databases," IEEE 1997, pp. 27–35. XP–002144267.

(List continued on next page.)

Primary Examiner—Hosain T. Alam
Assistant Examiner—Jacques Veillard
(74) Attorney, Agent, or Firm—Howrey Simon Arnold & White, LLP (57) ABSTRACT

A system and method for enhancing an online support service using a natural language interface. The online support system is connected to a user computer by the Internet or other communication links, and is used by a user to search and retrieve information from a database. The system provides an interface for online support services that is user friendly and accepts natural language queries. The natural language interface processes misspelled queries and queries having syntax errors. Furthermore, the natural language interface allows the system to extract information from prior sessions and upgrade its own vocabulary and knowledge database. The method comprises the steps of accessing a server computer by the user computer, entering a query in a natural language form, processing the query by the natural language interface coupled to the server computer, searching the database coupled to the server computer using the processed query, retrieving results from the database, and providing the results to the user. The system comprises a server computer coupled to the user computer, the server computer configured to receive a query in a natural language form from the user computer, a natural language interface coupled to the server computer, the natural language interface being configured to process the query, and a database coupled to the server computer and the natural language interface, the database being adapted to store information, wherein the natural language interface searches the database using the processed query and provides the results to the user computer through the server computer.

2 Claims, 6 Drawing Sheets

U.S. PATENT DOCUMENTS

| | | | |
|---|---|---|---|
| 5,218,536 A | | 6/1993 | McWherter .................. 364/419 |
| 5,257,366 A | | 10/1993 | Adair et al. ................. 395/600 |
| 5,265,065 A | | 11/1993 | Turtle ......................... 395/600 |
| 5,317,742 A | | 5/1994 | Bapat .......................... 395/600 |
| 5,377,103 A | * | 12/1994 | Lamberti et al. ...... 364/419.08 |
| 5,386,556 A | | 1/1995 | Hedin et al. ................. 395/600 |
| 5,404,507 A | | 4/1995 | Bohm et al. ................. 395/600 |
| 5,410,688 A | | 4/1995 | Williams et al. ............. 395/600 |
| 5,428,772 A | | 6/1995 | Merz .......................... 395/600 |
| 5,454,106 A | * | 9/1995 | Berns et al. ................. 395/600 |
| 5,491,820 A | | 2/1996 | Belove et al. .............. 395/600 |
| 5,519,608 A | | 5/1996 | Kupiec .................. 364/419.08 |
| 5,555,169 A | * | 9/1996 | Namba et al. .......... 364/419.08 |
| 5,590,319 A | | 12/1996 | Cohen et al. ................. 395/604 |
| 5,590,322 A | | 12/1996 | Harding et al. ............. 395/604 |
| 5,640,555 A | | 6/1997 | Kleewein et al. ............ 395/610 |
| 5,684,999 A | | 11/1997 | Okamoto ..................... 395/759 |
| 5,694,593 A | | 12/1997 | Baclawski ................... 395/605 |
| 5,706,499 A | | 1/1998 | Kleewein et al. ............ 395/610 |
| 5,740,421 A | | 4/1998 | Palmon ....................... 395/604 |
| 5,752,028 A | | 5/1998 | Ellacott ....................... 395/614 |
| 5,754,841 A | | 5/1998 | Carino, Jr. ................... 395/603 |
| 5,761,663 A | | 6/1998 | Lagarde et al. ............... 707/10 |
| 5,768,577 A | | 6/1998 | Kleewein et al. ............ 395/610 |
| 5,768,589 A | | 6/1998 | Bradley et al. .............. 395/684 |
| 5,778,368 A | | 7/1998 | Hogan et al. ................. 707/10 |
| 5,787,410 A | | 7/1998 | McMahon ..................... 707/1 |
| 5,787,424 A | | 7/1998 | Hill et al. ....................... 707/6 |
| 5,809,502 A | | 9/1998 | Burrows ........................ 707/7 |
| 5,826,261 A | | 10/1998 | Spencer ......................... 707/5 |
| 5,864,845 A | | 1/1999 | Voorhees et al. .............. 707/5 |
| 5,864,846 A | | 1/1999 | Voorhees et al. |
| 5,873,080 A | | 2/1999 | Coden et al. .................. 707/3 |
| 5,878,219 A | | 3/1999 | Vance, Jr. et al. ...... 395/200.47 |
| 5,884,302 A | | 3/1999 | Ho ................................ 707/3 |
| 5,895,466 A | * | 4/1999 | Goldberg et al. .............. 707/5 |
| 5,956,711 A | * | 9/1999 | Sullivan et al. ................ 707/6 |
| 6,144,958 A | * | 11/2000 | Ortega et al. ................... 707/5 |

OTHER PUBLICATIONS

Julian, Lauri et al. "Brightware Ships Web'sFirst Automated Real–Time Advice Agent," Brightware, Inc. Press Release, Jun. 29, 1998. XP–002924861. Http://www.brightware.com/news/99_6_2_9_bwships.html.

Lai, Hsiangchu et al. "A System Architecture of Intelligent–Guided Browsing on the Web," IEEE 1998, pp. 423–432. XP–002128394.

Yang, Kiduk et al. "IRIS at TREC–7," Seventh Test Retrieval Conference, Nov. 9–11, 1998, p. 1. XP–002142686.

* cited by examiner

SYSTEM AND METHOD FOR ENHANCING ONLINE SUPPORT SERVICES USING NATURAL LANGUAGE INTERFACE FOR SEARCHING DATABASE

RELATED APPLICATIONS

This application is related to concurrently filed U.S. application Ser. No. 09/327,605 filed on Jun. 8, 1999, commonly assigned, and which is incorporated herein by reference, and U.S. application Ser. No. 09,327,604 filed on Jun. 8, 1999, commonly assigned, and which is herein incorporated by reference.

BACKGROUND OF THE INVENTION

I. Field of the Invention

The present invention relates generally to online support services, and more particularly to a system and method for enhancing online support services using a natural language interface.

II. Description of the Related Art

Today, consumers are frequently relying on online support services to obtain assistance for various needs. For example, consumers use online support services to receive help in installation and trouble-shooting of appliances, computers, and other consumer goods.

In order to assist consumers, many retailers of goods and services provide online support services. A retailer may offer online support services through a traditional telephone link, in which case a consumer may dial a number to access the support service. Also, a retailer may offer online support services via the Internet or other communication links.

Figure 1:
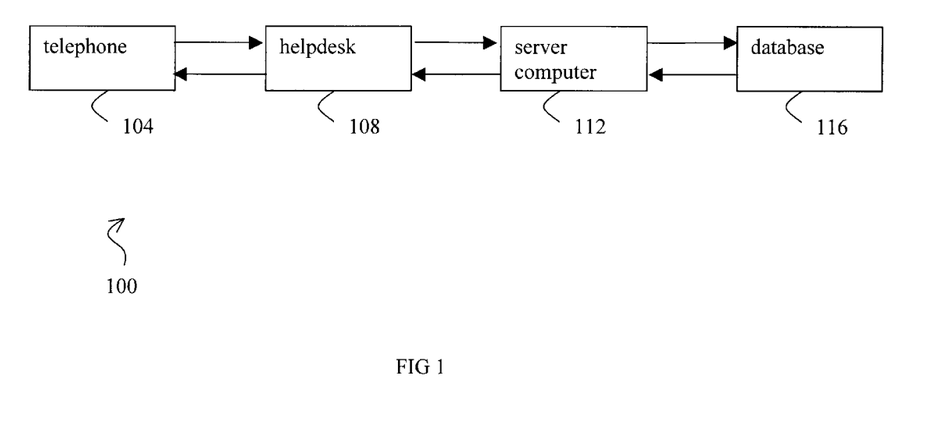
FIG. 1 illustrates a conventional online support system accessible via a telephone line.

FIG. 1 illustrates an online support system 100 accessible via a telephone link. The system 100 comprises a telephone 104, an online help desk 108, a server computer 112 and a database 116. A user dials a number to access the online help desk 108. Typically, a help desk operator is available to answer questions and assist the user. The operator takes one or more questions from the user, and uses the server computer 112 to access the database 116 to find an answer. The database 116 stores information regarding the retailer's products and services.

In order to get information from the database 116, the operator may enter a "query" (or "search request"). In response, the server computer 112 searches the database 116 for an answer and provides the answer to the operator. The operator will then relay the answer to the user.

Figure 2:
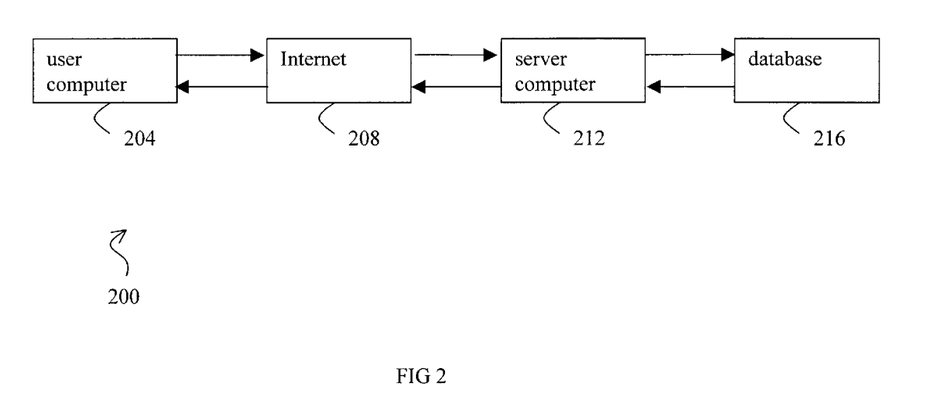
FIG. 2 illustrates an online support system connected to the Internet.

FIG. 2 illustrates an online support system 200 that is connected to the Internet. The system 200 comprises a user computer 204, the Internet shown generally by the reference numeral 208, a server computer 212 and a database 216. The system 200 differs from the system 100 described above in two ways. First, a user uses the computer 204 and the Internet to access the system. Secondly, the system 200 does not require a human operator. The user accesses the server computer 212 directly using the user computer 204. In order to get assistance, the user enters his own query. In response, the server computer 212 searches the database 216 for an answer and provides the answer to the user.

Although, users may receive assistance using conventional online support systems, there are many disadvantages associated with them. Most systems are not "user friendly." For example, they do not accept queries in a natural language form. Most systems require users and operators to formulate search words with Boolean operators. As a result, those unfamiliar with boolean operators experience difficulties using these systems.

Also, most systems provide answers only if there is an exact match between the user formulated search words and the content in the database. Most systems do not consider synonyms and other approximations of the search words. Thus, if the user or the operator do not use the "right" word in the query, it is likely that the system will fail to find a relevant answer for the user.

Furthermore, most systems are not capable of processing misspelled queries or queries having syntax errors. Most systems cannot deal with spelling and syntax errors. Thus a user who made a spelling or a syntax error in the query may not be able to find an answer.

Also, most systems are rigid in that their knowledge database does not evolve through use. Most systems do not extract information from prior search sessions to upgrade its own vocabulary and knowledge database. Also, most systems require an extensive dictionary to operate.

For these reasons, it has been recognized that there is a need for an interface for online support systems that is user friendly and accepts natural language queries. Also, there is a need for an interface that can process misspelled queries and queries having syntax errors. Furthermore, there is a need for an interface that allows a system to extract information from prior sessions and upgrade its own vocabulary and knowledge database.

SUMMARY OF THE INVENTION

The present invention is directed to a system and method for enhancing an online support service using a natural language interface. The online support system is connected to a user computer by the Internet or other communication links, and is used by a user to search and retrieve information from a database.

In one embodiment, the method comprises the steps of accessing a server computer by the user computer, entering a query in a natural language form, processing the query by the natural language interface coupled to the server computer, searching the database coupled to the server computer using the processed query, retrieving results from the database, and providing the results to the user. The method further comprises the steps of generating synonyms of the query by the natural language interface, and searching the database using the synonyms. The method further comprises the steps of generating phonetic approximations of the query by the natural language interface, and searching the database using the phonetic approximations.

In one embodiment, the system comprises a server computer coupled to the user computer, the server computer configured to receive a query in a natural language form from the user computer, a natural language interface coupled to the server computer, the natural language interface being configured to process the query, and a database coupled to the server computer and the natural language interface, the database being adapted to store information, wherein the natural language interface searches the database using the processed query and provides the results to the user computer through the server computer. The system further comprises means for generating synonyms of the query, and means for searching the database using the synonyms. The system further comprises means for generating phonetic approximations of the query, and means for searching the database using the phonetic approximations.

BRIEF DESCRIPTION OF THE DRAWINGS

In the drawings, like reference numbers generally indicate identical, functionally similar, and/or structurally similar elements. The drawings in which an element first appears is indicated by the leftmost digit(s) in the reference number.

DETAILED DESCRIPTION OF THE INVENTION

I. Overview of the Invention

The present invention is directed to an online support system and method using a natural language interface. The system can be used, for example, to obtain assistance in the installation and trouble-shooting of computers, appliances, and other consumer goods.

Briefly stated, the essential elements of the system are a server computer, a natural language interface, and a database. In one embodiment, a user uses a computer to gain access to the system. In another embodiment, the user uses a telephone to gain access to the system. The server computer is linked to the user via the Internet, a telephone line, or other communication links. The natural language interface allows a user to form queries in a natural language form, rather than in conventional search terms. The natural language interface processes the queries and searches the database for an answer. The natural language interface retrieves an answer from the database and provides the answer to the user via the server computer.

The present invention provides an interface for online support systems that is user friendly and accepts natural language queries. The natural language interface processes misspelled queries and queries having syntax errors. Furthermore, the natural language interface allows the system to extract information from prior sessions and upgrade its own vocabulary and knowledge database.

II. Description of the Preferred Embodiments

Figure 3:
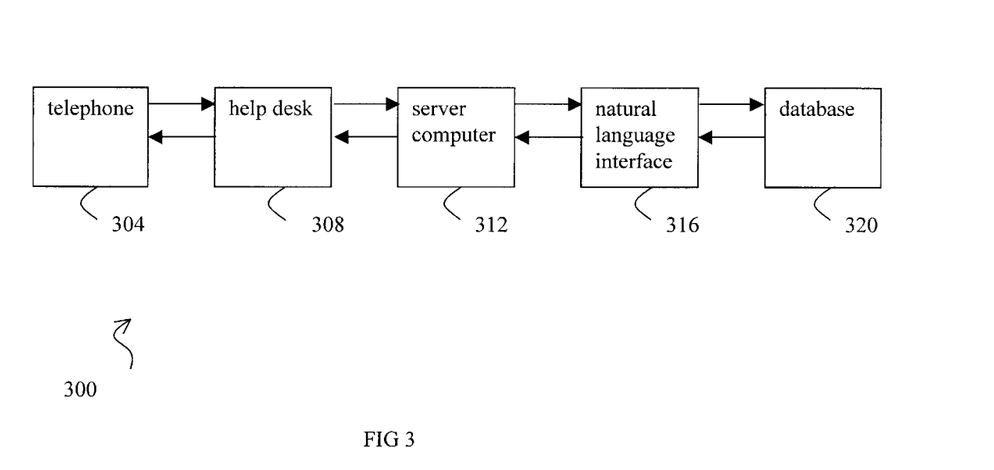
FIG. 3 illustrates an online support system using a natural language interface in accordance with one embodiment of the present invention.

FIG. 3 illustrates an online support system 300 using a natural language interface in accordance with one embodiment of the present invention. Referring now to FIG. 3, the system 300 comprises a telephone 304, a help desk 308, a server computer 312, a natural language interface 316, and a database 320. A user uses the telephone 304 to access the help desk 308. A help desk operator receives one or more questions from the user. Based on the questions, the operator enters one or more queries in the server computer 312.

The natural language interface 316, which is coupled to the server computer 312, allows the operator to form the queries in a natural language form, rather than in conventional search terms. The natural language interface 316 processes the queries and searches the database 320 for an answer. The natural language interface 316 retrieves an answer from the database 320, and provides the answer to the operator through the server computer 312. The operator then relays the answer to the user.

The natural language interface 316 is at the core of the invention. The natural language interface 316 is described in detail in a concurrently filed and commonly assigned application titled, "Natural Language Interface for Searching Database", which is incorporated herein by reference in its entirety for all purposes.

Figure 4:
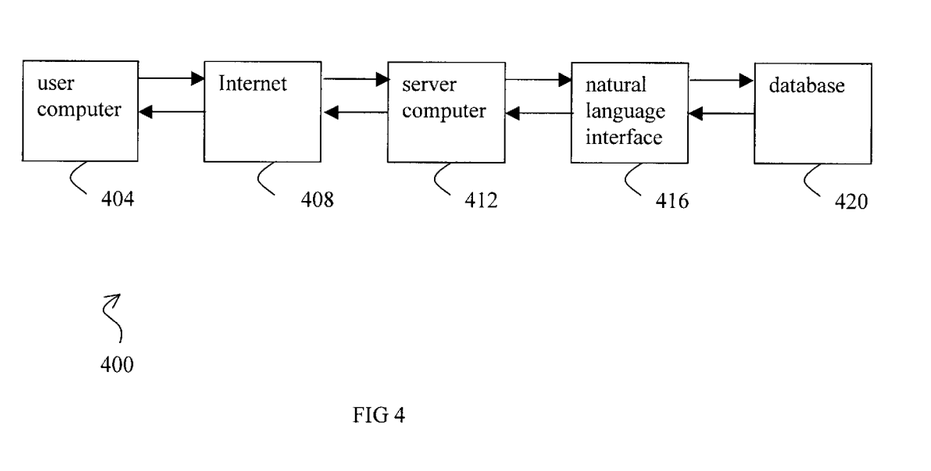
FIG. 4 illustrates an online support system in accordance with another embodiment of the present invention.

FIG. 4 illustrates another embodiment of the present invention. Referring now to FIG. 4, an online support system 400 comprises a user computer 404, the Internet 408, a server computer 412, a natural language interface 416, and a database 420. The user computer 404 is linked to the server computer 412 via the Internet 408. The server computer 412 and the database 416 are provided by retailers of goods and services.

The system 400 differs from the system 300 in several ways. First, the user uses the user computer 404 to gain access to the system. Secondly, the system 400 does not require a human operator. Rather, the user is directly linked to the server computer 412 via the Internet 408.

In one embodiment, the server computer 412 provides a web page, which is accessed via the Internet. The user enters the web page using the user computer 404. The user enters a query, and sends the query to the server computer 412 via the Internet.

In one embodiment, the natural language interface 416 is coupled to the server computer 412 and the database 420. The natural language interface 416 allows the user to formulate a query in a natural language form, rather than in conventional search terms. Thus, the natural language interface 416 provides the user with a "user friendly" interface.

The natural language interface 416 processes the query and searches the database 420. The database stores information regarding the retailer's goods and services. The natural language interface 416 retrieves results from the database and provides the results to the server computer 412. The server computer 412 sends the results back to the user computer 404 via the Internet.

The natural language interface 416 can process a query even if there is not an exact match between the user formulated query or search words and the content in the database. Thus, even if the user does not use the "right" word in the query, the natural language interface 416 may still be able to assist user in finding a relevant answer.

As described in detail in the concurrently filed and commonly assigned application titled, "Natural Language Interface for Searching Database", U.S. application Ser. No. 09/327,605, which is incorporated herein by reference in its entirety for all purposes, the system generates synonyms of the query. Consider, for example, that a user submits a search request: My dog is sick. The system extracts the words dog and sick in order to construct search words "dog sick." The system then creates one or more alternate search words using synonyms. Each synonym is assigned a coefficient based on the closeness of its meaning to the original word. The original word is assigned a coefficient 1.0. This process is shown below in Table I.

TABLE I

| Word | Synonym | Coefficient |
|------|---------|-------------|
| Dog  | Canine  | 0.9 |
| Dog  | Animal  | 0.7 |
| Sick | Ill     | 0.8 |

TABLE I-continued

| Word | Synonym | Coefficient |
| --- | --- | --- |
| Sick | Hospital | 0.7 |
| Sick | Doctor or veterinarian | 0.6 |

The synonyms and various combinations thereof are used to form alternate search words. The alternate search words are listed in an order based on their combined total weights. Thus, an order of alternate words based on synonymous approximations of "Dog Sick" can be "Canine Ill" with a combined total weight of 0.8 (0.9 +0.8=1.7), "Animal Ill" with a combined total weight of (0.7+0.8=1.5), and "Animal Hospital" with a combined total weight of (0.7+0.7=1.4). A search word may also be formed by a single word such as Dog (1.0), Canine (0.9) or Ill (0.8), etc.

Furthermore, the system constructs additional search words by a method known as phonetic approximation. The system selects words that are phonetically similar or bear a close resemblance to the original words "Dog" and "Sick." The system assigns a coefficient to each phonetically similar word based on its similarity with the original word, and uses the phonetically similar words and combinations thereof to form additional search words.

Furthermore, the natural language interface 416 is capable of processing misspelled queries or queries having syntax errors. Thus a user who made a spelling or a syntax error in the query may still be able to obtain assistance from the system 400. As described in more detail in the concurrently filed and commonly assigned application titled, "Natural Language Interface for Searching Database", U.S. application Ser. No. 09/327,605, which is incorporated herein by reference in its entirety for all purposes, the system registers each user automatically as the user accesses the system. The system creates a preference file as the user is registered. The preference file may be implemented in the system server or the client server. The preference file stores information about to the user, including, but not limited to, information about the user's own natural language vocabulary, writing style, common spelling errors, use of synonyms, etc. The preference file is updated as new information is automatically learned from the user.

Figure 5:
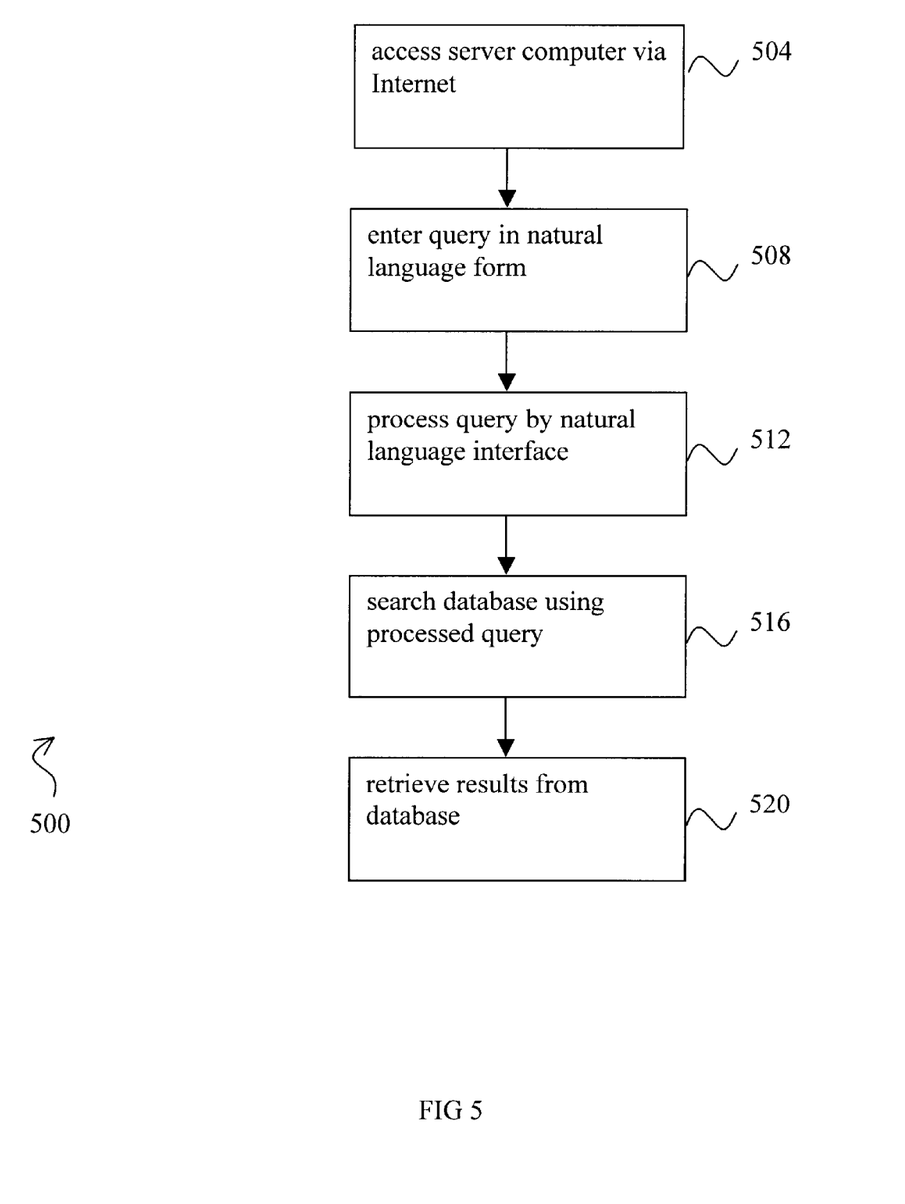
FIG. 5 is a flow diagram of steps involved in using the online support system.

FIG. 5 is a flow diagram 500 of steps involved in using the online support system of FIG. 4. In a step 504, the user accesses the server computer 412 using the user computer 404. The user computer 404 is linked to the server computer 412 via the Internet.

In a step 508, the user enters a query. The natural language interface 416 allows the user to formulate the query in a natural language form. In a step 512, the natural language interface 416 processes the query. In a step 516, the database 420 is searched using the processed query. In a step 520, the results are retrieved from the database 420 and provided to the user.

Figure 6:
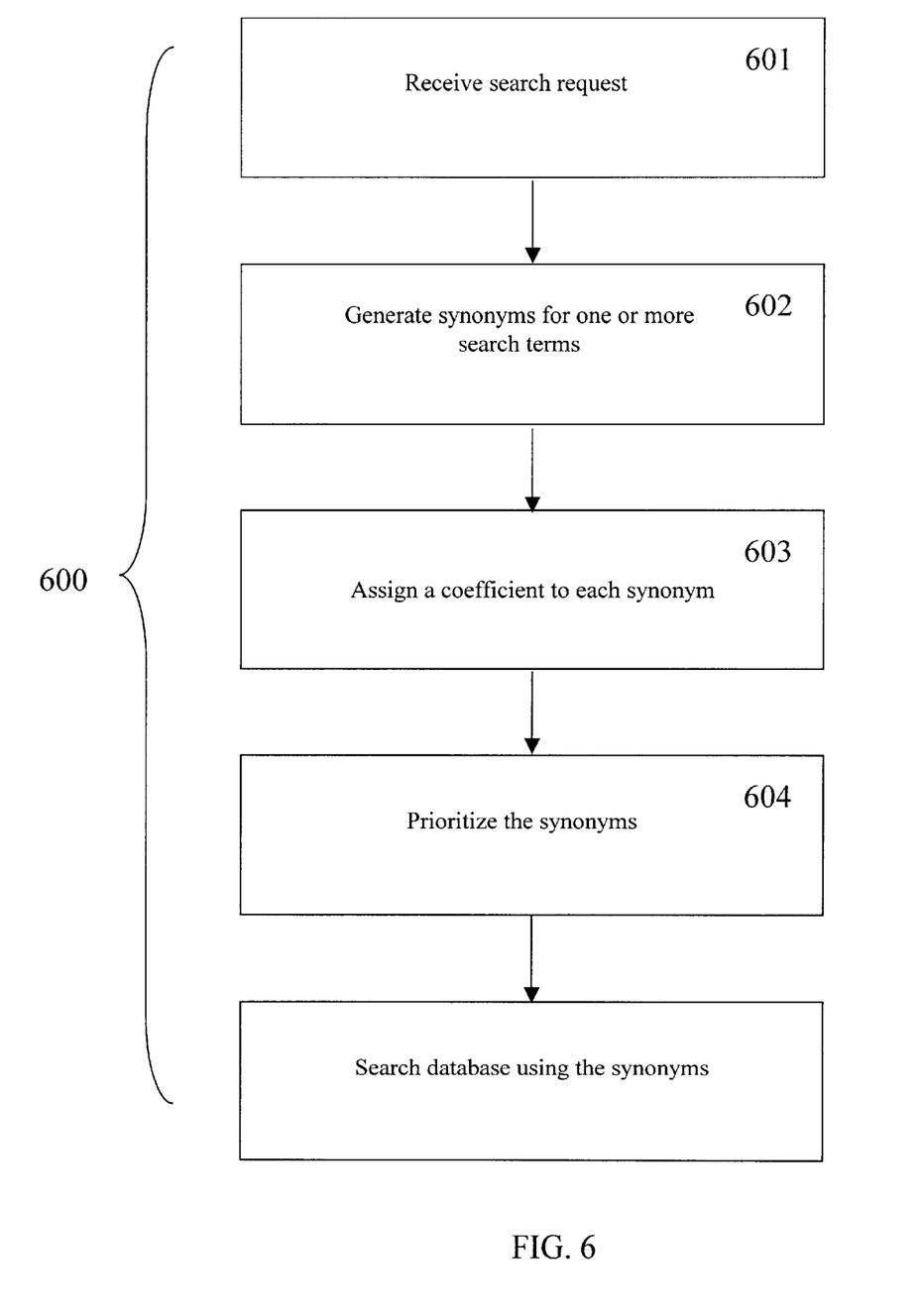
FIG. 6 is a flow diagram of steps involved in synonym searching.

FIG. 6 is a flow diagram 600 of steps involved in one embodiment of the natural language interface of the invention. A master engine (ME) is assigned to a user to process the user's search request. The system can be configured so that a master engine is assigned to two or more users.

The ME receives a search request 601 from the system server and forms a list of search words. The search words include phonetic approximations, synonymous approximations 602, and various combinations of the search words. The ME creates one or more alternate search words using synonyms. Each synonym is assigned a coefficient 603 based on the closeness of its meaning to the original word. The original word is assigned a coefficient 1.0. An example for the search request "My dog is sick" is provided below in Table I. The ME extracts the words "dog" and "sick" in order to construct search words "dog sick".

TABLE I

| word | synonym | coefficient |
| --- | --- | --- |
| dog | canine | 0.9 |
| dog | animal | 0.7 |
| sick | ill | 0.8 |
| sick | hospital | 0.7 |
| sick | doctor or veterinarian | 0.6 |

The synonyms and various combinations thereof are used to form alternate search words. The alternate search words are listed in an order based on their combined total weights 604. Thus, an order of alternate words based on synonymous approximations of "Dog Sick" can be, for example, "Canine Ill" with a combined total weight of 1.7 (=0.9+0.8), "Animal Ill" with a combined total weight of 1.5 (=0.7+0.8), and "Animal Hospital" with a combined total weight of 1.4 (=0.7+0.7). A search word may also be formed by a single word such as Dog (1.0), Canine (0.9), or Ill (0.8), etc.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for enhancing an online support system using a natural language interface, the online support system being used by a user to search and retrieve information from a database, the method comprising the steps of:

accessing a server computer by the user computer;

entering a query in natural language form;

processing the query by the natural language interface coupled to the server computer;

searching the database coupled to the server computer using the processed query;

retrieving results from the database;

providing the results;

creating a preference file for the user;

storing information about the user in the preference file, the information including information relating to the user's identification and information regarding the user's own vocabulary, use of synonyms, common spelling errors, and unique writing style;

retrieving stored information from the preference file to analyze the query;

generating synonyms of the query by the natural language interface;

searching the database using the synonyms;

assigning a coefficient to each of the synonyms based on closeness of meaning to associated words in the query, wherein each original word in the query has the highest coefficient with respect to each of the synonyms associated with each original word; and prioritizing the synonyms.

2. A system for enhancing an online support service, the system being used by a user to search and retrieve information from a database, comprising:

a server computer coupled to the user computer, the server computer configured to receive a query in natural language form from the user computer;

a natural language interface coupled to the server computer, the natural language interface being configured to process the query;

a database coupled to the server computer and the natural language interface, the database being adapted to store information;

one or more preference files for storing information about the user, including personal information related to the user, and information regarding the user's own vocabulary, use of synonyms, common spelling errors, and unique writing style, wherein the stored information is retrieved from the preference file to analyze the query;

means for generating synonyms of the query;

means for searching the database using the synonyms;

means for assigning a coefficient to each of the synonyms based on closeness of meaning to associated words in the query, wherein each original word in the query has the highest coefficient with respect to each of the synonyms associated with each original word; and means for prioritizing the synonyms, wherein the natural language interface searches the database using the processed query and provides the results to the user computer through the server computer.

* * * * *